United States Patent [19]

Kanamori

[11] Patent Number: 5,842,379

[45] Date of Patent: Dec. 1, 1998

[54] SHIFT LEVER

[75] Inventor: Teiji Kanamori, Aichi-ken, Japan

[73] Assignee: Kabushiki Kaisha Tokai-Rika-Denki-Seisakusho, Aichi-ken, Japan

[21] Appl. No.: 773,500

[22] Filed: Dec. 23, 1996

[30] Foreign Application Priority Data

Dec. 28, 1995 [JP] Japan .................................. 7-342509

[51] Int. Cl.⁶ ........................... F16H 63/38; F16H 59/10; F16H 63/30
[52] U.S. Cl. ........................ 74/473.28; 74/473.3; 74/523; 74/538
[58] Field of Search .......................... 74/473.27, 473.28, 74/473.3, 473.31, 473.33, 473.34, 473.35, 523, 538, 566

[56] References Cited

U.S. PATENT DOCUMENTS

| | | | |
|---|---|---|---|
| 4,565,151 | 1/1986 | Buma | 74/566 X |
| 5,179,870 | 1/1993 | Behrens et al. | 74/473.3 |
| 5,372,051 | 12/1994 | Kanematsu et al. | 74/523 X |
| 5,666,855 | 9/1997 | Ebenstein et al. | 74/538 X |

FOREIGN PATENT DOCUMENTS 6-174060  6/1994  Japan .
7-31454  6/1995  Japan .

*Primary Examiner*—Allan D. Herrmann
*Attorney, Agent, or Firm*—Sixbey Friedman Leedom & Ferguson; Thomas W. Cole

[57] ABSTRACT

To easily and inexpensively manufacture a shift lever by a forming mold of a simple structure for insert-molding without using another component such as a cap member or the like for preventing resin from penetrating into the hollow interior of the pipe member. The shift lever is formed such that a resin member is integrally formed onto a rod member by molding in a state in which an opening of a hollow pipe hole of the rod member is exposed outside of a forming mold for insert-molding or is closed with a forming mold for closing an end opening. Accordingly, when resin is injected into the forming mold for insert-molding, resin is prevented from penetrating into the hollow pipe hole of the rod member so that the shift lever in which the resin member is reliably formed onto the rod member can be obtained.

5 Claims, 3 Drawing Sheets

5,842,379

SHIFT LEVER

BACKGROUND OF THE INVENTION

1. Field of the Invention

The present invention relates to a shift lever which is manufactured by insert-molding as an assembled component in a shift lever apparatus which effects a shifting operation on a transmission of a vehicle.

2. Description of the Related Art

Typically, an automatic transmission of a vehicle is structured to be speed-changed at a plurality of stages and a plurality of shift ranges are set therefor. In order to select a desired shift range from the plurality of the shift ranges, a shift lever apparatus is employed. The shift lever apparatus is constituted such that a shifting position can be selected by effecting a shifting operation on the shift lever.

As illustrated in FIG. 4, some shift lever mounted on a shift lever apparatus is constituted such that a resin member portion 12 is formed onto a base end portion of a metal pipe member 10 by insert-molding. Conventionally, as a first means for manufacturing such a shift lever by insert-molding, an opening at the end portion of a hollow pipe hole of the pipe member 10 has been closed by a cap member 14 fitted into the opening. The pipe member 10 closed by the cap member 14 is set at a predetermined position of a forming mold for insert-molding so that resin is prevented from penetrating into the hollow interior of the pipe member 10. According to the first means, since the cap member 14 must be manufactured and then fitted into the pipe member 10 in advance, there has been a drawback in that the number of components increases and working process increases. Therefore, manufacturing cost becomes expensive and a product price of a shift lever becomes expensive.

Further, a second means for manufacturing a shift lever by insert-molding is constituted such that the pipe member 10 is set at a predetermined position of a forming mold for insert-molding, and the insert-molding is effected in a state in which a forming mold member is fully inserted into the hollow interior of the pipe member 10 so that resin is prevented from penetrating into the hollow interior of the pipe member 10. According to the second means, since the forming mold member to be inserted into the hollow interior of the pipe member 10 must be made separately and mounted into the forming mold for insert-molding, there has been a drawback in that the structure of the forming mold for insert-molding becomes complicated and manufacturing equipment becomes expensive.

SUMMARY OF THE INVENTION

In view of the aforementioned facts, it is an object of the present invention to provide a shift lever easily and inexpensively manufactured by a forming mold of a simple structure for insert-molding without using another component such as a cap member or the like for preventing resin from penetrating into the hollow interior of the pipe member.

In accordance with a first aspect of the present invention, there is provided a method of manufacturing a shift lever in which a resin member is integrally formed onto a rod member by molding in a state in which an opening portion of a hollow pipe hole of the rod member is exposed outside of a forming mold for insert-molding or is closed with a forming mold for closing an end opening.

In accordance with a second aspect of the present invention, there is provided a shift lever having a resin member integrally formed onto a rod member by molding in a state in which an opening portion of a hollow pipe hole of the rod member is exposed outside of a forming mold for insert-molding or is closed with a forming mold for closing an end opening.

In accordance with the above-said structure, when resin is injected into the forming mold for insert-molding, resin is prevented from penetrating into the hollow pipe hole of the rod member so that the resin member is reliably formed onto the rod member.

The above and other objects, features and advantages of the present invention will become apparent from the following description and the appended claims, taken in conjunction with the accompanying drawings in which preferred embodiments of the present invention are shown by way of illustrative examples.

BRIEF DESCRIPTION OF THE DRAWINGS

The invention will now be described with reference to the accompanying drawings wherein.

DESCRIPTION OF THE PREFERRED EMBODIMENTS

Figure 1:
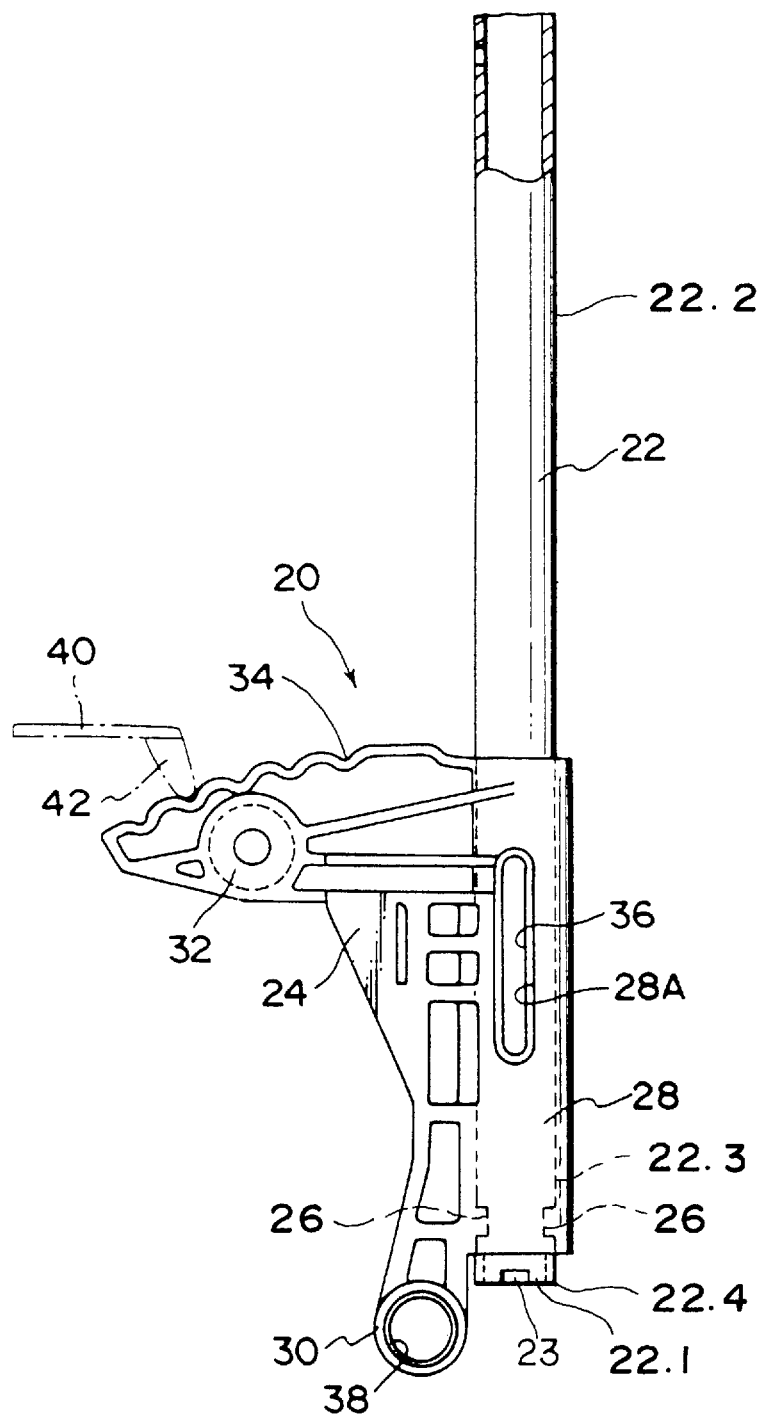
FIG. 1 is a partly broken side view of a shift lever body portion according to a first embodiment of the present invention.

A body portion of a shift lever according to a first embodiment of the present invention is shown in FIG. 1. As shown in FIG. 1, a shift lever body 20 comprises a rod member 22 and a resin member 24.

The rod member 22 is made of a hollow metal pipe member and the hollow pipe hole 22.1 thereof is open at the end portions thereof. The rod member 22 has an upper end 22.2, and a lower end 22.3 that terminates in an edge 22.4.

Figure 2:
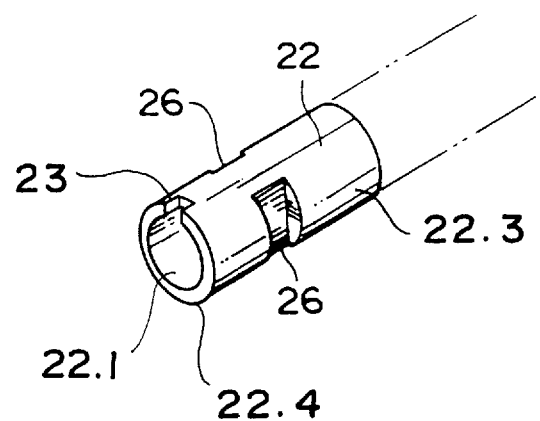
FIG. 2 is a perspective view of a main portion of a rod member of the shift lever body portion according to the first embodiment of the present invention.

As shown in FIG. 2, locking portions 26 formed by partially recessing the rod member 22 are provided at a portion of the rod member on which the resin member 24 is integrally formed by molding. Further, the locking portion 26 can be formed at a single portion or at a plurality of portions of the rod member 22. Moreover, the locking portion 26 may have a convex-shaped configuration or may have a non-circular cross-sectional configuration.

Further, an oblong hole 36 for accepting a detent pin which is not shown is formed through the rod member 22 at a lower middle portion thereof in FIG. 1. The detent pin is provided through the oblong hole 36 so as to move slidably in the axial direction of the rod member 22. Moreover, the detent pin is constituted such that when a button of a shift knob which is mounted to the upper end portion of the rod member 22 is pressed, the detent pin moves vertically within the oblong hole 36. Accordingly, the detent pin is engageable with or is detachable from concave-convex portions of a detent portion which is not shown and is fixed to a vehicle body. As a result, a shift change operation of the shift lever can be controlled under a fixed condition.

The resin member 24 which is integrally formed onto the rod member 22 by molding, is formed into a substantially triangular-shaped configuration as seen from a front direction thereof so as to include a rod member securing portion 28, a shift lever shaft receiving portion 30, a connection portion 32 for gearing a transmission, and a click feeling application portion 34 by which a feeling of click is applied to an operator of a shift lever of a vehicle.

The rod member securing portion 28 is integrally formed onto the rod member 22 by molding so as to cover a predetermined portion adjacent to a lower end portion of the rod member 22 in FIG. 1. Further, when the rod member securing portion 28 has been formed onto the rod member 22 by molding, the locking portion 26 is embedded in the rod member securing portion 28. Accordingly, the locking portion 26 and the rod member 22 are prevented from rotating relative each other and the rod member 22 is prevented from falling off from the rod member securing portion 28. The rod member securing portion 28 also has a hole 28A formed at a portion corresponding to the oblong hole 36 of the rod member 22 in order to pass the detent pin not shown therethrough. The hole 28A of the rod member securing portion 28 has an opening area wider than that of the oblong hole 36 of the rod member 22.

As shown in FIG. 1, the rod member securing portion 28 is constituted such that the rod member 22 extends upwardly from an upper end portion of the rod member securing portion 28 in FIG. 1 and a predetermined length of a lower end portion of the rod member 22 extends downwardly from a lower end portion thereof in FIG. 1. Further, a recessed portion 23 which is recessed inwardly of the rod member 22 is formed at the lower end portion of the rod member 22.

Moreover, a shift lever shaft receiving portion 30 is integrally formed by molding at the lower left side, in FIG. 1, of the rod member securing portion 28 which has been formed onto the rod member 22 by insert-molding.

A shaft hole 38 is formed in the shift lever shaft receiving portion 30 such that a shaft of a shift lever apparatus which is not shown passes through the shaft hole 38 and the shift lever body 20 is rotatably supported around the shaft at a predetermined angle.

Further, the shaft hole 38 is formed at a position displaced from an axis of the rod member 22. More specifically, the axis of the rod member 22 is placed in a direction different from a radial direction with respect to the central axis of the shaft hole 38. Therefore, because the shift lever body 20 is constituted in such a manner as described above, when the shift lever body 20 has been rotated around the shaft, it is possible to set a state of fluctuation of the shift lever body 20 so that the operability of the shift lever body 20 a user of the shift lever feels can be improved.

The connecting portion 32 is integrated with the click feeling application portion 34 at a portion extending to the upward and transverse left direction of the rod member securing portion 28 in FIG. 1.

The connecting portion 32 is reinforced at the periphery thereof in the vicinity of the free end portion extending from the rod member securing portion 28 and has a through hole formed at the central portion thereof.

The connecting portion 32 is connected to an end portion of a gearing wire connected to a transmission of a vehicle which is not shown. Accordingly, when a fluctuating operation is effected on the shift lever body 20, a transmission is geared into the fluctuating operation so that a shifting operation of the transmission is effected.

Further, the click feeling application portion 34 which is provided at an upper side portion of the resin member 24 in FIG. 1 is corrugated so as to correspond to a predetermined position of the shift lever body 20 at which a shift position stops. A projected head portion 42 is provided at a free end portion of a resilient projected piece portion 40 fixed to a side of a vehicle body. The projected head portion 42 is pressed into contact with the click feeling application portion 34 slidably and resiliently.

When the shift lever body 20 is fluctuated to effect a shifting operation and the projected head portion 42 moves from one concave portion to the next concave portion of the click feeling application portion 34, a stress deforming the resilient projected piece portion 40 acts on the same so that a feeling of clicking the shift lever body 20 is applied to the shift operation.

A description of a method of manufacturing the shift lever body 20 by insert-molding according to the first embodiment of the present invention as described above will be given hereinafter.

A rod member 22 is set at a predetermined portion of a forming mold (not shown) for insert-molding so as to form the shift lever body 20. At this time, the opening at the end portion of the hollow pipe hole of the rod member 22 at the side of which the resin member 24 is formed by molding is at least closed with a portion of the forming mold, or is exposed outside of the forming mold. Then, the forming mold is set at a predetermined portion of the side peripheral surface of the rod member 22 so as to close the oblong hole 36 of the rod member 22 by the forming mold, and resin is injected into the mold so that the resin member 24 is formed onto the rod member 22 by insert-molding.

In this way, in a case that the shift lever body 20 is formed by insert-molding, since the opening at the end portion of the hollow pipe hole of the rod member 22 is exposed outside of the forming mold for insert-molding or closed by the portion of the forming mold, molten resin which has been injected into the forming mold is prevented from penetrating into the interior of the rod member 22 so that an excellent molded product of a shift lever by insert-molding can be obtained.

Next, a description of a second embodiment of the present invention will be given hereinafter. The second embodiment is provided such that an axial direction of the rod member corresponds to a radial direction with respect to a rotation center of the shaft of a shift lever shaft receiving portion. Accordingly, a shift lever shaft receiving portion 30 is disposed downwardly of a lower end portion of the rod member 22 in FIG. 3.

Figure 3:
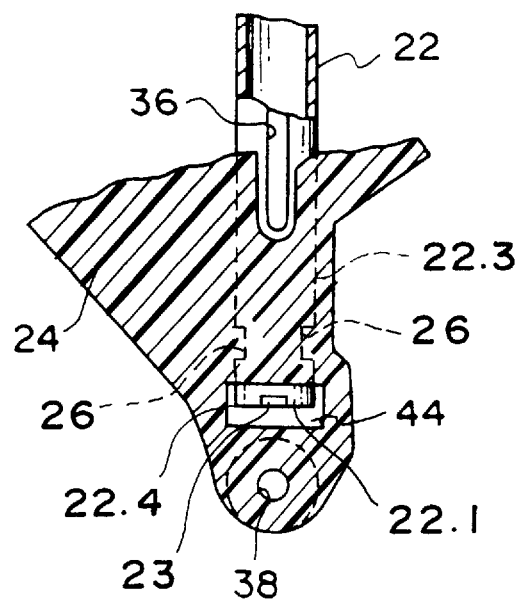
FIG. 3 is a longitudinal cross-sectional side view of a main portion of the shift lever body portion according to a second embodiment of the present invention.
Figure 4:
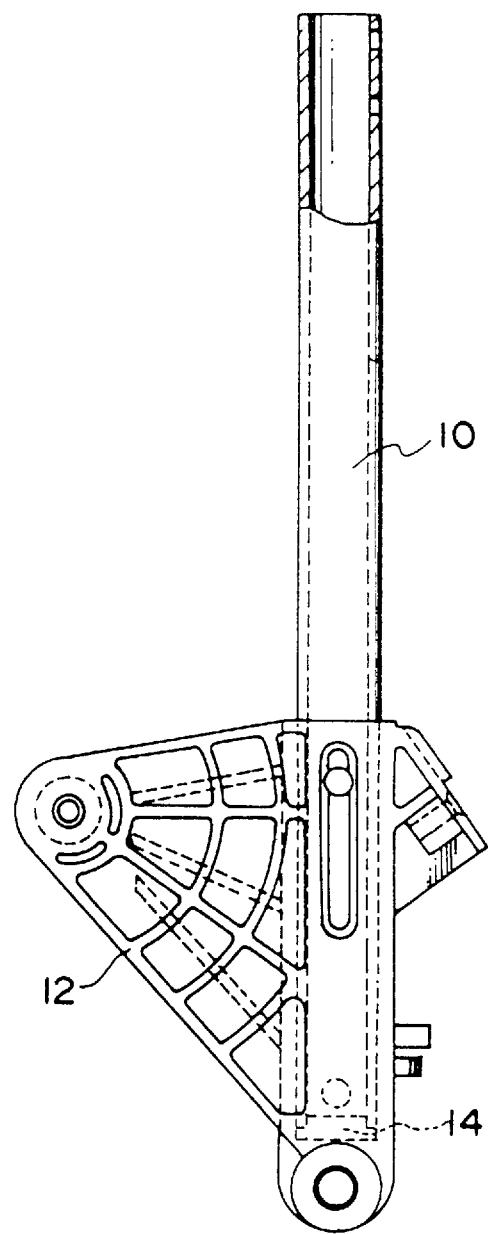
FIG. 4 is a partly broken side view of a prior art shift lever body portion.

Further, as shown in FIG. 3, an opening 44 in which a lower portion of the rod member 22 is exposed is formed in the resin member 24.

A description of a manufacturing method of the shift lever body 20 by insert-molding according to the second embodiment of the present invention constituted as described above will be given hereinafter.

A rod member 22 is set at a predetermined portion of a forming mold (not shown) so as to form the shift lever body 20 by insert-molding. At this time, a portion adjacent to an end portion of the rod member 22 at which the resin member 24 is formed by molding is covered with a portion of a forming mold for closing the opening at the end portion of the hollow pipe hole of the rod member 22. The forming mold can be formed by two split molds corresponding to the configuration of an opening portion 44. Further, since a forming mold is required to have a configuration which can close the open end portion of the rod member 22, the forming mold may be formed into a U-shaped or a flat plate-shaped cross-sectional configuration.

A forming mold including the forming mold for closing the opening 22.1 at the end portion of the hollow pipe hole of the rod member 22 is set at a predetermined portion of the rod member 22 and resin is injected into the forming mold so as to form the resin member 24 onto the rod member 22 by insert-molding.

As described above, in a case that the shift lever body 20 is formed by insert-molding, since the opening 22.1 at the end portion of the hollow pipe hole of the rod member 22 is closed by a portion of the forming mold, molten resin which has been injected into the forming mold does not penetrate into the end portion of the hollow pipe.

Since the second embodiment has the identical structure, operation and effect to the first embodiment except for those described above in the second embodiment, a description therefor will be omitted.

As described above, the shift lever of the present invention can be manufactured easily and at a low cost by using a forming mold for insert-molding having a simpler structure and prevent resin from penetrating into the rod member without using another component such as a cap member or the like.

While the embodiments of the present invention as herein disclosed constitute a preferred form, it is to be understood that other forms might be adopted.

What is claimed is:

1. A shift lever body, comprising:
   an elongated rod member including a hollow pipe having an upper end, and a lower end that terminates in an edge circumscribing a hole leading to an interior of said hollow pipe, and
   a resin body having a rod securing portion integrally molded around an end of said rod; and a shaft hole for rotatable supporting said shaft lever body having an axis of rotation displaced from a longitudinal axis of said rod,
   wherein said edge of said lower end of said hollow pipe extends beyond said rod securing portion of said integrally molded resin body to obviate the need for capping said hole during molding of said resin body.

2. The shift lever body defined in claim 1, wherein said rod securing portion has a lower end that terminates before the lower end of said hollow pipe terminates.

3. The shift lever body defined in claim 1, wherein said rod securing portion has a lower end that extends beyond said lower end of said hollow pipe.

4. A shift lever body, comprising:
   a rod member including a hollow pipe having an upper end, and a lower end that terminates in a hole leading to an interior of said hollow pipe, and
   an integrally molded resin body having a click portion at one end for receiving a projected head portion, a shift lever shaft receiving portion at an opposite end, and a rod securing portion between said ends surrounding said lower end of said hollow pipe,
   wherein an edge of said lower end of said hollow pipe extends beyond said rod securing portion of said integrally formed resin body to obviate the need for capping said hole during the molding of said resin body.

5. A shift lever body comprising a rod member including a hollow pipe having an end that terminates in a hole, and a resin member having a rod securing portion integrally formed over the end of said hollow pipe with an opening over said hole to obviate the need for capping said hole during molding, and a click portion at one end for receiving a projected head portion.

* * * * *